United States Patent
Song et al.

(10) Patent No.: US 12,458,596 B2
(45) Date of Patent: Nov. 4, 2025

(54) IMMUNOMODULATORY HYDROGEL AND PREPARATION METHOD THEREOF

(71) Applicant: Institute of Radiation Medicine, Chinese Academy of Medical Sciences & Peking Union Medical College, Tianjin (CN)

(72) Inventors: Huijuan Song, Tianjin (CN); Qiang Liu, Tianjin (CN); Ningning He, Tianjin (CN); Manman Zhang, Tianjin (CN); Yan Wang, Tianjin (CN); Jinhan Wang, Tianjin (CN); Liqing Du, Tianjin (CN); Chang Xu, Tianjin (CN); Kaihua Ji, Tianjin (CN)

(73) Assignee: Institute of Radiation Medicine, Chinese Academy of Medical Selences & Peking Union Medical College, Tianjin (CN)

( * ) Notice: Subject to any disclaimer, the term of this patent is extended or adjusted under 35 U.S.C. 154(b) by 0 days.

(21) Appl. No.: 19/004,480

(22) Filed: Dec. 30, 2024

(65) Prior Publication Data
US 2025/0213472 A1    Jul. 3, 2025

(30) Foreign Application Priority Data
Jan. 3, 2024    (CN) .......... 202311687739.X

(51) Int. Cl.
| | | |
|---|---|---|
| A61K 9/107 | (2006.01) | |
| A61K 9/06 | (2006.01) | |
| A61K 31/194 | (2006.01) | |
| A61K 47/34 | (2017.01) | |
| A61P 29/00 | (2006.01) | |
| A61P 37/02 | (2006.01) | |

(52) U.S. Cl.
CPC .............. *A61K 9/1075* (2013.01); *A61K 9/06* (2013.01); *A61K 31/194* (2013.01); *A61K 47/34* (2013.01); *A61P 29/00* (2018.01); *A61P 37/02* (2018.01)

(58) Field of Classification Search
CPC ...... A61K 9/1075; A61K 9/06; A61K 31/194; A61K 47/34; A61P 29/00; A61P 37/02
See application file for complete search history.

(56) References Cited

FOREIGN PATENT DOCUMENTS

| | | |
|---|---|---|
| CN | 116531321 A | 8/2023 |
| CN | 116650463 A | 8/2023 |

OTHER PUBLICATIONS

English translation from Google Patents of CN 116532321 A—2023, pp. 1-8 (Year: 2023).*
Ding et al., Multifunctional hydrogel loaded with 4-octyl itaconate exerts antibacterial, antioxidant and angiogenic properties for diabetic wound repair, Biomaterials Advances, 139 (2022) 212979, pp. 1-15 (Year: 2022).*
Lee S H, et al., "Enzyme-mediated cross-linking of Pluronic copolymer micelles for injectable and in situ forming hydrogels", Acta biomaterialia, 2011, pp. 1468-1476, vol. 7, No. 4.

* cited by examiner

*Primary Examiner* — Aradhana Sasan

(57) ABSTRACT

An immunomodulatory hydrogel is prepared using methoxy polyethylene glycol amine (mPEG-$NH_2$) as an initiator, the mPEG-$NH_2$ reacts with L-tyrosine-N-carboxyanhydrides (L-Tyr-NCAs) to form a methoxy polyethylene glycol-poly L-tyrosine (PETyr) as a PETyr block copolymer. The PETyr is then reacted with tyrosinase to form an oxidized methoxy polyethylene glycol-poly L-tyrosine copolymer (PETO). By co-dissolving the PETO with octyl itaconate nanomicelles (ITA8) in a disperse medium, an itaconic acid-loaded immunomodulatory hydrogel (PETO-ITA8) is obtained.

11 Claims, 4 Drawing Sheets

IMMUNOMODULATORY HYDROGEL AND PREPARATION METHOD THEREOF

CROSS-REFERENCE TO RELATED APPLICATION

This application claims priority to Chinese Patent Application No. 202311687739.X, filed Jan. 3, 2024, which is herein incorporated by reference in its entirety.

TECHNICAL FIELD

The disclosure relates to the technical field of biomedical materials, and more particularly to an immunomodulatory hydrogel and a preparation method thereof.

BACKGROUND

At present, a variety of methods have been adopted in this field to initiate immunomodulation for tissue repair, including the use of therapeutic drugs, stem cells and cytokines. However, these methods are not easily applied due to difficulties in vivo delivery, rapid diffusion or degradation, and complex factors in vivo.

In addition, studies have found that hydrogel dressings, due to their three-dimensional porous network and high hydration capacity, can promote the exchange of oxygen and nutrients and are increasingly being used in the field of tissue repair and regeneration. However, the technologies for preparing hydrogel drugs in the related art are complex, have a single function, and lack diverse biological functions.

SUMMARY

The purpose of the disclosure is to provide an immunomodulatory hydrogel and a preparation method thereof, thereby solving problems that hydrogel drugs in the related art have complex technologies, a single function and lack diverse biological functions.

In order to solve the aforementioned problems, the disclosure first provides the immunomodulatory hydrogel. Methoxy polyethylene glycol amine (mPEG-NH$_2$) is used as an initiator to react with L-tyrosine-N-carboxyanhydrides (L-Tyr-NCAs) to form a methoxy polyethylene glycol-poly L-tyrosine (PETyr) as a PETyr block copolymer, and a structural formula of the PETyr is

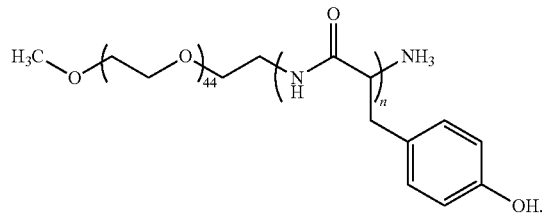

Then the PETyr reacts with tyrosinase to form an oxidized methoxy polyethylene glycol-poly L-tyrosine copolymer (PETO), and the PETO is co-dissolved with octyl itaconate nanomicelles (ITA8) in a disperse medium to obtain an itaconic acid-loaded immunomodulatory hydrogel (PETO-ITA8).

In an embodiment, a total molecular weight range of the PETyr is 3127 grams per mole (g/mol) to 5220 g/mol.

In an embodiment, a concentration of the PETyr in a hydrogel system is 50 milligrams per milliliter (mg/mL) to 300 mg/mL, and a concentration of the ITA8 in the hydrogel system is 62.5 micromoles per liter (μM) to 1 millimole per liter (mM).

In an embodiment, a polymerization degree of poly L-tyrosine in the PETyr block copolymer is 7 to 20, and a content of the poly L-tyrosine in the PETyr block copolymer is 36% to 62%.

In an embodiment, the disperse medium comprises water, a phosphate buffered saline (PBS) buffer solution, a sodium chloride injection solution, and a glucose injection solution.

The disclosure also provides the preparation method of the immunomodulatory hydrogel, which is used to prepare the immunomodulatory hydrogel described in the above technical solution, including the following steps:

ring opening polymerization reaction: dissolving the mPEG-NH$_2$ with the L-Tyr-NCAs in anhydrous N,N-dimethylformamide (DMF), and reacting in a water bath under a nitrogen atmosphere to obtain the PETyr block copolymer; and the structural formula of the PETyr is

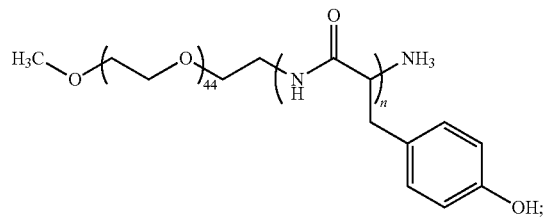

drying: adding dropwise a solution of the PETyr into ice-cold ethyl ether for precipitation and filtration to obtain precipitate, and vacuum-drying the precipitate to obtain freeze-dried powder of the PETyr block copolymer;

dialysis: dissolving the freeze-dried powder of the PETyr block copolymer in water, dialyzing the freeze-dried powder of the PETyr block copolymer in deionized water, and freeze-drying a dialysis solution to obtain dialyzed freeze-dried powder of the PETyr block copolymer;

oxidation reaction: dissolving the dialyzed freeze-dried powder of the PETyr block copolymer in the disperse medium, and reacting the dialyzed freeze-dried powder of the PETyr block copolymer with the tyrosinase to obtain the PETO;

assembly of nanomicelles: self-assembling octyl itaconate in an aqueous solution to form the ITA8; and synthetic hydrogel: uniformly dispersing the ITA8 into the PETO to obtain the PETO-ITA8.

In an embodiment, a dialysis bag with a molecular weight cutoff of 1000 Dalton (Da) is used in the dialysis, and a dialysis time is 48 hours.

In an embodiment, a molecular weight of the mPEG-NH$_2$ is 500 g/mol to 5000 g/mol.

In an embodiment, a molar ratio of the mPEG-NH$_2$ to the L-Tyr-NCAs is 1:7-20.

In an embodiment, a concentration of the PETyr in a hydrogel system is 50 mg/mL to 300 mg/mL, and a concentration of the ITA8 in the hydrogel system is 62.5 μM to 1 mM.

The immunomodulatory hydrogel and the preparation method thereof provided by the disclosure have the following technical advantages.

The preparation method of the disclosure is simple and easy to operate, and is formed by self-assembly using an interaction between hydrophilic and hydrophobic segments of the copolymer, without involving complicated chemical reactions or toxic organic crosslinking reagents, which facilitates production and clinical translation.

The immunomodulatory hydrogel of the disclosure can effectively regulate the typing of macrophages and stimulate differentiation of the macrophages into M2 type. The M2 type macrophages are extremely important in a process of wound healing, can effectively accelerate a speed of the wound healing and promote regeneration of blood vessels and dermis. They can also scavenge reactive oxyradicals, inhibit lipid peroxidation caused by free radicals, and protect a body from oxidative damage and inflammatory cascade reaction caused by radiation.

BRIEF DESCRIPTION OF DRAWINGS

In order to provide a clearer explanation of the embodiments of the disclosure or the technical solutions in the related art, a brief introduction will be given below to the accompanying drawings required in the description of the embodiments or the related art. It is apparent that the accompanying drawings in the following description are some of the embodiments of the disclosure. For those skilled in the art, other drawings can be obtained based on the structures shown in these drawings without creative labor.

DETAILED DESCRIPTION OF EMBODIMENTS

In order to make the aforementioned purpose, features and advantages of the disclosure more obvious and understandable, the following will provide a detailed description of the specifical embodiments of the disclosure, in conjunction with the accompanying drawings. It should be understood that the specific embodiments described here are merely for the purpose of explaining the disclosure and do not limit the scope of the disclosure.

Embodiment 1: Preparation of an Oxidized Methoxy Polyethylene Glycol-Poly L-Tyrosine Copolymer (Referred to as PETO)

Figure 1:
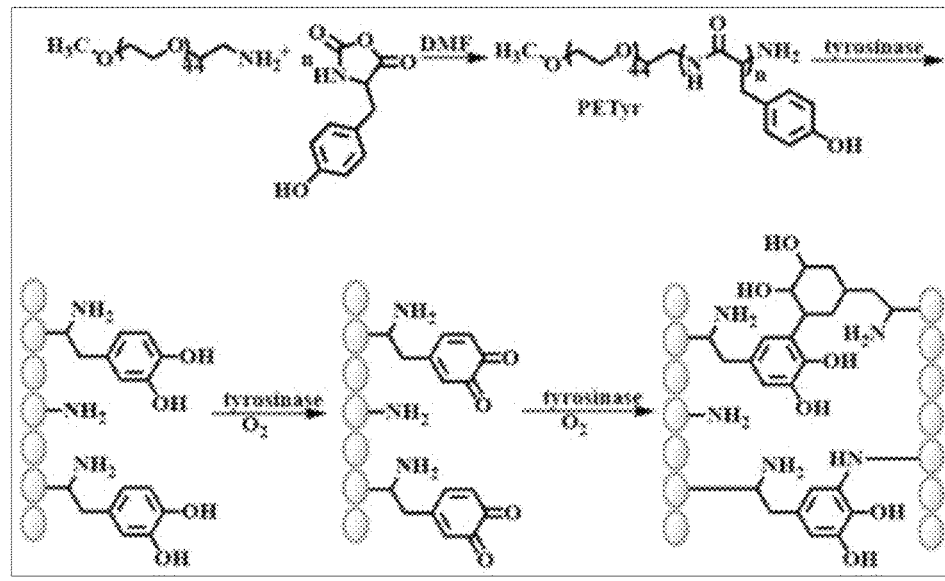
FIG. 1 illustrates a chemical synthesis route of an oxidized methoxy polyethylene glycol-poly L-tyrosine according to an embodiment 1.

Preparation steps of the PETO are as follows, and a synthesis route is shown in FIG. 1.

(1) 289 milligrams (mg) of L-tyrosine-N-carboxyanhydrides (L-Tyr-NCAs) and 400 mg of methoxy polyethylene glycol amine (mPEG-NH$_2$) with a molecular weight of 2000 g/mol are weighed and added to a round-bottom flask with magnetic stirring to form a mixture, and 10 milliliters (mL) of anhydrous N,N-dimethylformamide (DMF) is added to fully dissolve the mixture to obtain a methoxy polyethylene glycol-poly L-tyrosine (PETyr) as a PETyr block copolymer.

(2) A reaction vessel is placed in a 30° C. water bath and reacted under a nitrogen atmosphere for 72 hours.

(3) A solution of the PETyr is added dropwise into 200 mL of ice-cold ethyl ether for precipitation and filtration to obtain precipitate under a reduced pressure, and the precipitate is dried to constant weight in a vacuum desiccator to obtain freeze-dried powder of the PETyr.

(4) The freeze-dried powder of the PETyr is dissolved in water and sealed into a dialysis bag to perform dialysis, a molecular weight cutoff of the dialysis bag is 1000 Da, and a dialysis time is 48 hours. Then freeze-drying is performed to obtain a PETyr copolymer at a temperature of −50° C.

(5) The PETyr copolymer is reacted with tyrosinase for 48 hours to obtain the PETO.

Embodiment 2: Preparation and Characterization of Octyl Itaconate Nanomicelles (ITA8)

Preparation steps of the ITA8 are that: octyl itaconate is dissolved in Milli-Q® ultrapure water to prepare a solution with 3 mg/mL; the solution is sonicated at 20% power for 10 minutes using an ultrasonic disruptor to ensure uniform dispersion; the solution is allowed to stand for 20 minutes to stabilize, and then the ITA8 are obtained.

The characterization and observation of the ITA8 are as follows.

The ITA8 is diluted into a 1 mg/mL solution using the Milli-Q® ultrapure water. 10-20 microliters (μL) of a sample are dropped onto a 230-mesh copper grid with a carbon support film, and the sample is then dried at a constant temperature. 5 μL of 1%-2% uranyl acetate are used for staining for 5 minutes, and a staining solution (i.e., the 1%-2% uranyl acetate) is absorbed with a filter paper. A sample morphology is observed using a transmission electron microscope (TEM) after drying at a room temperature.

The ITA8 is diluted into the 1 mg/mL solution using the Milli-Q® ultrapure water. A particle size and a polydispersity index (DPI) of the ITA8 are detected by dynamic light scattering (DLS) at a temperature of 25° C., an angle of 90°, and a laser wavelength of 633 nanometers (nm). Each sample is equilibrated for 2 minutes before each detection, and each sample is tested three times, with an average value being taken.

Figure 2:
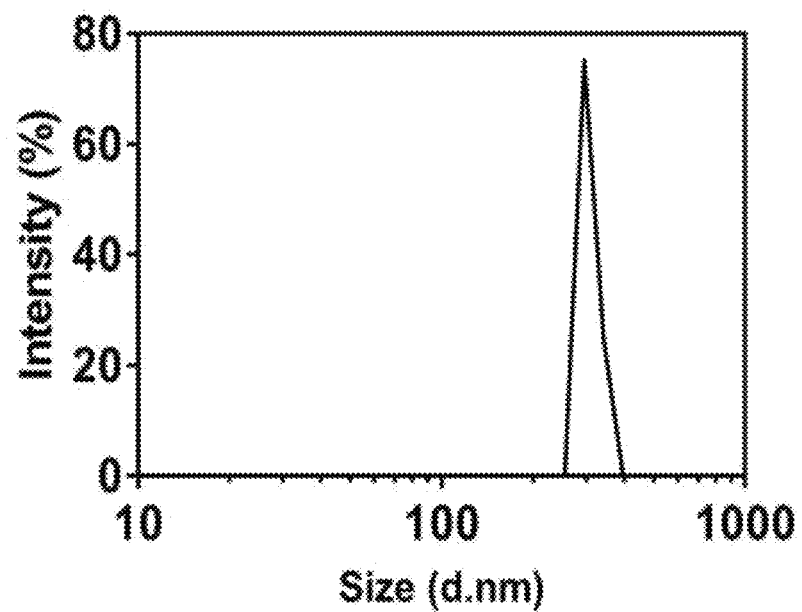
FIG. 2 illustrates a particle size distribution diagram of light scattering of octyl itaconate nanomicelles according to an embodiment 2.

FIG. 2 illustrates a particle size distribution diagram of light scattering of the ITA8 prepared in the embodiment 2, and an average particle size is 300 nm and the polydispersity index is 0.2.

Embodiment 3: Preparation and Gelation Behavior Detection of an Immunomodulatory Hydrogel (i.e., an Itaconic Acid-Loaded Immunomodulatory Hydrogel PETO-ITA8)

Synthesis steps of the PETO-ITA8 are as follows: the ITA8 prepared in the embodiment 2 is uniformly dispersed into a solution of the PETO of the embodiment 1 to obtain the PETO-ITA8.

The PETO-ITA8 can be administered for treatment through oral administration, subcutaneous injection, and skin surface application, and can be used for tissue damage repair and wound healing, including skin damage from burns and scalds, periodontitis, mechanical injuries caused by external forces, as well as skin damage, intestinal damage, heart damage, and lung damage induced by radiation.

An internal morphology, a rheological property and an injectability of the PETO-ITA8 are studied through a scanning electron microscopy (SEM; S-4800, Hitachi, Japan). A characterization is performed through an AR2000ex rheometer (TA), and a secondary structure of polypeptides in the PETO-ITA8 is analyzed through a circular dichroism spectropolarimeter (J-810, JASCO).

Figure 3:
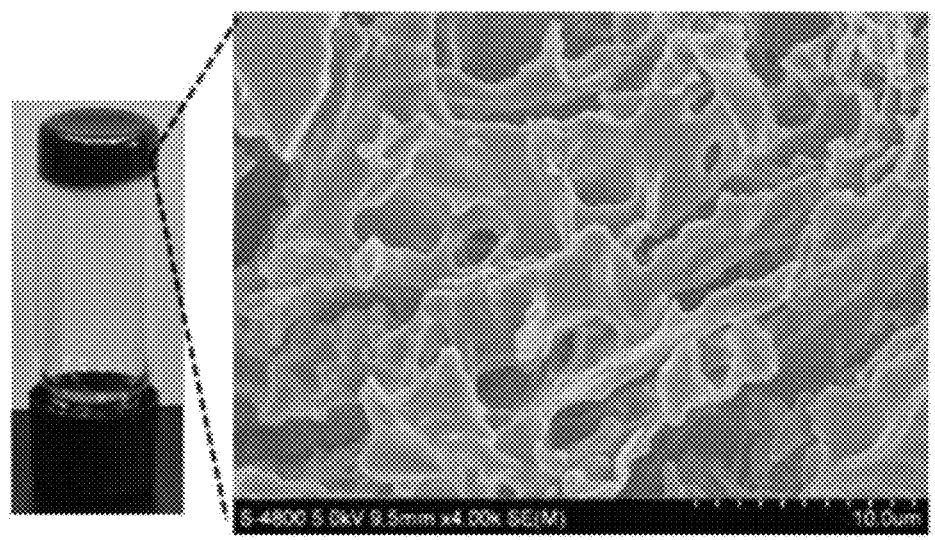
FIG. 3 illustrates a scanning electron microscope diagram of an itaconic acid-loaded immunomodulatory hydrogel according to an embodiment 3.

As shown in FIG. 3, the PETO-ITA8 has a three-dimensional porous structure, which will be conducive to cell migration and transmissions of nutrients and cytokines.

Embodiment 4: Detection of a Scavenging Ability of the PETO-ITA8 for Reactive Oxyradicals An ability of the PETO-ITA8 to scavenge hydrogen peroxide ($H_2O_2$) at 25° C. is evaluated using an Amplite™ hydrogen peroxide detection kit. A 50 µL of 40 micromoles per liter (µM) $H_2O_2$ solution (PBS, 25 mM, pH7.4) is added to a 96-well plate, and then 50 µL of hydrogels with different components are added. After 2 hours of reaction, a $H_2O_2$ concentration is measured with the above kit according to a manufacturer's protocol (AAT Bioquest, USA).

Figure 4:
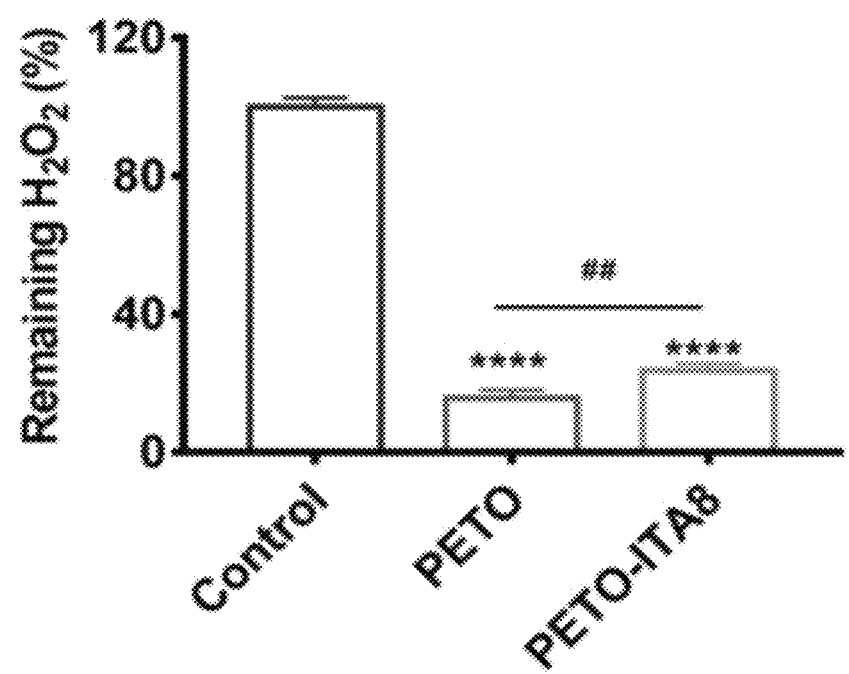
FIG. 4 illustrates a detection diagram of a scavenging ability of the immunomodulatory hydrogel for reactive oxyradicals according to an embodiment 4.

FIG. 4 illustrates a detection diagram of the scavenging ability of the PETO-ITA8 for reactive oxyradicals in the embodiment 4. It can be seen from FIG. 4 that a level of reactive oxygen species in a hydrogel group is significantly reduced, which indicates that the ITA8 do not weaken the scavenging ability of the PETO-ITA8 for reactive oxygen radicals.

Embodiment 5: Test of a Regulatory Ability of the PETO-ITA8 on Macrophage Polarization The test includes the following steps.

(1) Bone marrow-derived macrophages (BMDMs) are isolated from C57BL/6 (6 weeks old) mice, and bone marrows of femur and tibia are perfused with phosphate buffered saline (PBS). Then red blood cell lysis is performed, and collected cells are inoculated into a 6-well plate and cultured in a Roswell Park Memorial Institute (RPMI) 1640 medium containing 10% inactivated fetal bovine serum (FBS, Gibco, USA) and 20 nanograms per milliliter (ng/mL) M-CSF. After 6 days of culture at 37° C. in a 5% $CO_2$ incubator, most of adhered cells are the BMDMs.

(2) The BMDMs are inoculated in the 6-well plate at a density of $4 \times 10^5$ cells per well and stimulated with lipopolysaccharide (LPS) for 24 hours.

(3) PETO-ITA8 (250 µg/mL) is added into a fresh medium, and the fresh medium is incubated for 48 hours.

(4) Cells are collected by centrifugation and washed twice with cold PBS.

(5) The treated cells are stained with fluorescein isothiocyanate (FITC) labeled CD86 antibody, phycoerythrin (PE) labeled F4/80 antibody and allophycocyanin (APC) labeled CD206, and then analyzed by flow cytometry (C6, BD, USA).

Figure 5A:
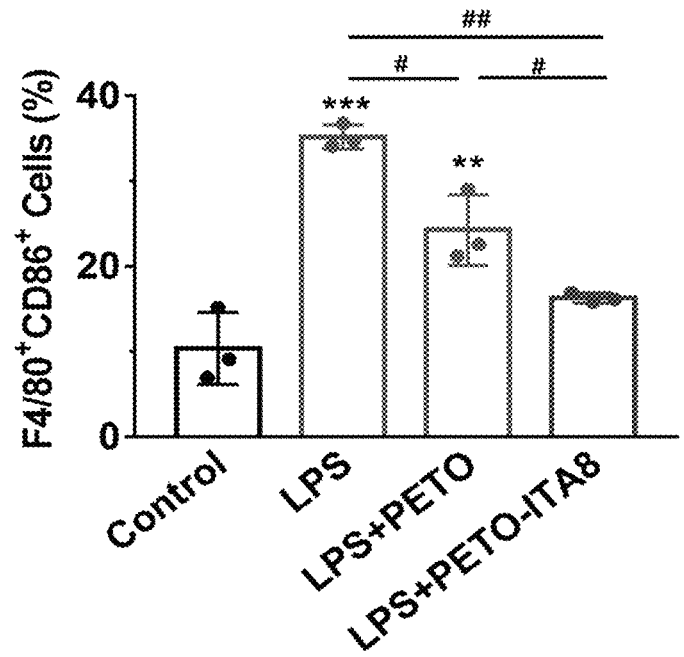
FIGS. 5A-5B illustrate a regulation diagram of macrophage polarization by the immunomodulatory hydrogel according to an embodiment 5.
Figure 5B:
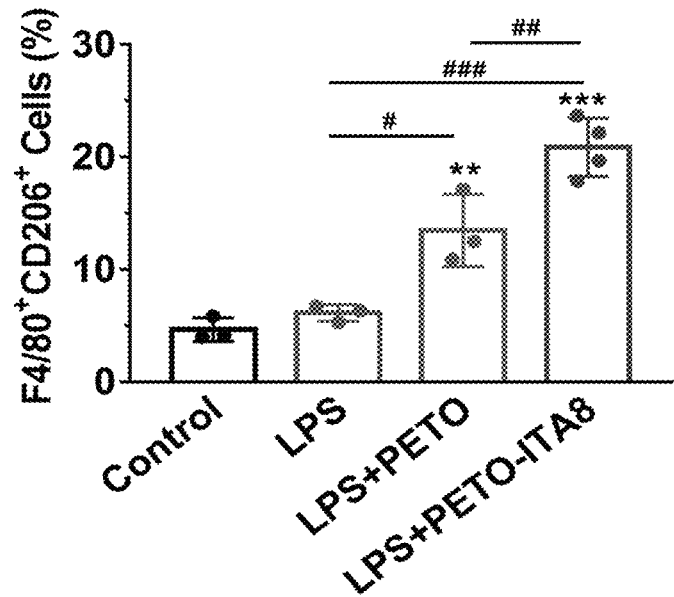

FIGS. 5A-5B illustrate a regulation of a M1 polarization proportion and a M2 polarization proportion of macrophages by the PETO-ITA8. It can be seen from FIGS. 5A-5B that the proportion of F4/80+CD86+BMDMs (M1) in the cells with added the ITA8 is reduced, while the proportion of F4/80+CD206+BMDMs (M2) is significantly increased, which indicates an ability to reshape the polarization of macrophages under inflammatory conditions.

Embodiment 6: Detection of an Anti-Inflammatory Capability of the PETO-ITA8

Figure 6A:
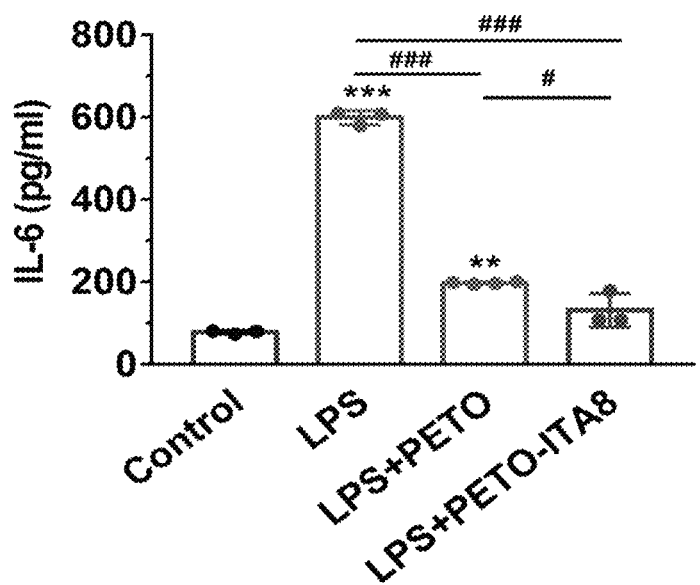
FIGS. 6A-6B illustrate a detection diagram of an anti-inflammatory ability of the immunomodulatory hydrogel according to an embodiment 6.
Figure 6B:
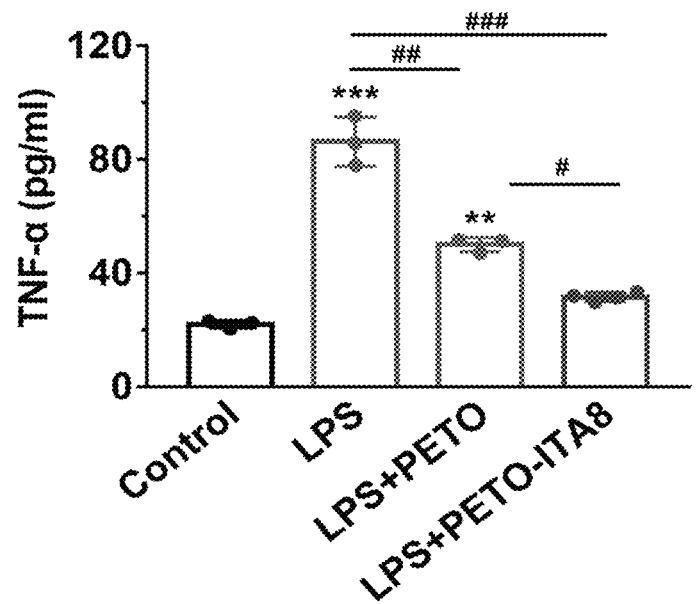

Cytokines Interleukin6 (IL-6) and Tumor Necrosis Factor-alpha (TNF-α), as pro-inflammatory cytokines, are detected in the cell culture medium of the embodiment 5 using an enzyme-linked immunosorbent assay (Elisa) kit. As shown in FIGS. 6A-6B, after stimulation with LPS, the IL-6 secreted by macrophages increases to 599 picograms per milliliter (pg/mL), and TNF-α increases to 86 pg/mL, while the PETO and PETO-ITA8 can significantly reduce the secretion of the two pro-inflammatory cytokines, and the PETO-ITA8 shows a more pronounced reduction compared with the PETO. This indicates that an antioxidant property of the PETO and a potent anti-inflammatory function of the ITA8 are effectively utilized. It further proves that the composite hydrogel PETO-ITA8 can alleviate inflammation, inhibit M1-type polarization of macrophages, and promote M2-type polarization.

Although the disclosure is disclosed as above, the disclosure is not limited thereto.

Those skilled in the art may make various modifications and amendments without departing from the spirit and scope of the disclosure, thus the protection scope of the disclosure should be determined by the claims.

Finally, it should also be noted that in this text, relational terms such as "first" and "second" are merely used to distinguish one entity or one operation from another entity or another operation, and do not necessarily require or imply any such actual relationship or order between these entities or operations. Moreover, the terms "include", "comprise" or any other variants thereof are intended to encompass non-exclusive inclusion, so that a process, method, article, or device that includes a series of elements includes not only those elements but also other elements that are not expressly listed, or elements are inherent in such a process, method, article, or device. Unless otherwise specified, an element qualified by a phrase "including a . . . " does not exclude existence of other like elements in the process, method, article, or device that includes a specified element.

In this specification, each embodiment is described in a progressive manner, with each embodiment focusing on the differences from other embodiments. The similar or identical parts of each embodiment can be referred to each other.

The above description of the disclosed embodiments enables those skilled in the art to realize or use the disclosure. A variety of modifications to these embodiments will be obvious to those skilled in the art. The general principles defined herein can be implemented in other embodiments without departing from the spirit or scope of the disclosure. Therefore, the disclosure will not be limited to the embodiments shown herein, but will conform to the widest scope consistent with the principles and novel features disclosed herein.

What is claimed is:

1. An immunomodulatory hydrogel, wherein methoxy polyethylene glycol amine (mPEG-$NH_2$) is used as an initiator to react with L-tyrosine-N-carboxyanhydrides (L-Tyr-NCAs) to form a methoxy polyethylene glycol-poly L-tyrosine (PETyr) as a PETyr block copolymer, and a structural formula of the PETyr is

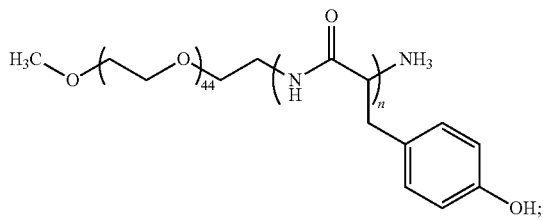

the PETyr reacts with tyrosinase to form an oxidized methoxy polyethylene glycol-poly L-tyrosine copolymer (PETO), and the PETO is co-dissolved with octyl itaconate nanomicelles (ITA8) in a disperse medium to obtain an itaconic acid-loaded immunomodulatory hydrogel (PETO-ITA8); and
wherein a concentration of the PETyr in a hydrogel system is 50 milligrams per milliliter (mg/mL) to 300 mg/mL, and a concentration of the ITA8 in the hydrogel system is 62.5 micromoles per liter (μM) to 1 millimole per liter (mM).

2. The immunomodulatory hydrogel as claimed in claim 1, wherein a total molecular weight range of the PETyr is 3127 grams per mole (g/mol) to 5220 g/mol.

3. The immunomodulatory hydrogel as claimed in claim 1, wherein a polymerization degree of poly L-tyrosine in the PETyr block copolymer is 7 to 20, and a content of the poly L-tyrosine in the PETyr block copolymer is 36% to 62%.

4. The immunomodulatory hydrogel as claimed in claim 1, wherein the disperse medium comprises water, a phosphate buffered saline (PBS) buffer solution, a sodium chloride injection solution, and a glucose injection solution.

5. A preparation method of the immunomodulatory hydrogel as claimed in claim 1, comprising the following steps:
ring opening polymerization reaction: dissolving the mPEG-NH$_2$ with the L-Tyr-NCAs in anhydrous N,N-dimethylformamide (DMF), and reacting in a water bath under a nitrogen atmosphere to obtain the PETyr block copolymer; wherein the structural formula of the PETyr is

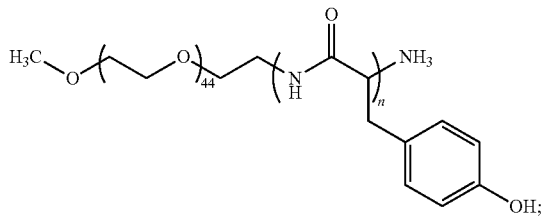

drying: adding dropwise a solution of the PETyr into ice-cold ethyl ether for precipitation and filtration to obtain precipitate, and vacuum-drying the precipitate to obtain freeze-dried powder of the PETyr block copolymer;

dialysis: dissolving the freeze-dried powder of the PETyr block copolymer in water, dialyzing the freeze-dried powder of the PETyr block copolymer in deionized water, and freeze-drying a dialysis solution to obtain dialyzed freeze-dried powder of the PETyr block copolymer;

oxidation reaction: dissolving the dialyzed freeze-dried powder of the PETyr block copolymer in the disperse medium, and reacting the dialyzed freeze-dried powder of the PETyr block copolymer with the tyrosinase to obtain the PETO;

assembly of nanomicelles: self-assembling octyl itaconate in an aqueous solution to form the ITA8; and synthetic hydrogel: uniformly dispersing the ITA8 into the PETO to obtain the PETO-ITA8.

6. The preparation method as claimed in claim 5, wherein a dialysis bag with a molecular weight cutoff of 1000 Dalton (Da) is used in the dialysis, and a dialysis time is 48 hours.

7. The preparation method as claimed in claim 5, wherein a molecular weight of the mPEG-NH$_2$ is 500 g/mol to 5000 g/mol.

8. The preparation method as claimed in claim 5, wherein a molar ratio of the mPEG-NH$_2$ to the L-Tyr-NCAs is 1:7-20.

9. The preparation method as claimed in claim 5, wherein preparation steps of the assembly of nanomicelles comprise:
dissolving the octyl itaconate in ultrapure water to prepare a solution at a concentration of 3 mg/mL;
sonicating the solution at 20% power for 10 minutes using an ultrasonic disruptor to obtain a uniformly dispersed solution; and
allowing the uniformly dispersed solution to stand for 20 minutes to stabilize, thereby to obtain the ITA8.

10. The immunomodulatory hydrogel as claimed in claim 5, wherein an average particle size of the ITA8 is 300 nanometers (nm), and a polydispersity index of the ITA8 is 0.2.

11. The immunomodulatory hydrogel as claimed in claim 1, wherein an average particle size of the ITA8 is 300 nm, and a polydispersity index of the ITA8 is 0.2.

* * * * *